United States Patent [19]
Manoogian et al.

[11] 3,786,995
[45] Jan. 22, 1974

[54] AERATOR SPRAY ATTACHMENT FOR FAUCETS

[75] Inventors: Alex Manoogian, Grosse Pointe Farms; Eric V. Pullen, Northville, both of Mich.

[73] Assignee: Masco Corporation, Taylor, Mich.

[22] Filed: May 3, 1972

[21] Appl. No.: 250,007

[52] U.S. Cl. ............................ 239/428.5, 239/449
[51] Int. Cl. ............................................. E03c 1/084
[58] Field of Search 239/396, 428.5, 436, 437, 579, 239/587, 446, 448, 449

[56] References Cited
UNITED STATES PATENTS

| | | | |
|---|---|---|---|
| 3,358,934 | 12/1967 | Moen | 239/428.5 X |
| 3,112,885 | 12/1963 | Bell et al. | 239/436 X |
| 2,790,680 | 4/1957 | Rosholt | 239/396 X |
| 3,524,591 | 8/1970 | Samuels et al. | 239/428.5 |
| 3,667,683 | 6/1972 | Gilbert | 239/428.5 |

*Primary Examiner*—M. Henson Wood, Jr.
*Assistant Examiner*—Michael Y. Mar
*Attorney, Agent, or Firm*—Whittemore, Hulbert & Belknap

[57] ABSTRACT

A combination spray and aerator device for attachment to a faucet to selectively discharge water in the form of a conical spray or an aerated stream. The device includes a housing attached to the faucet by a swivel member through which water is discharged into a chamber in the housing having two outlet ports, one of which discharges through an aerating device and the other of which discharges through spray-forming passages. A ball valve member in the chamber is adapted to close one outlet port while opening the other. Rotation of the housing on the swivel member brings one or the other of the outlet ports beneath the ball valve member so as to be closed thereby.

14 Claims, 4 Drawing Figures

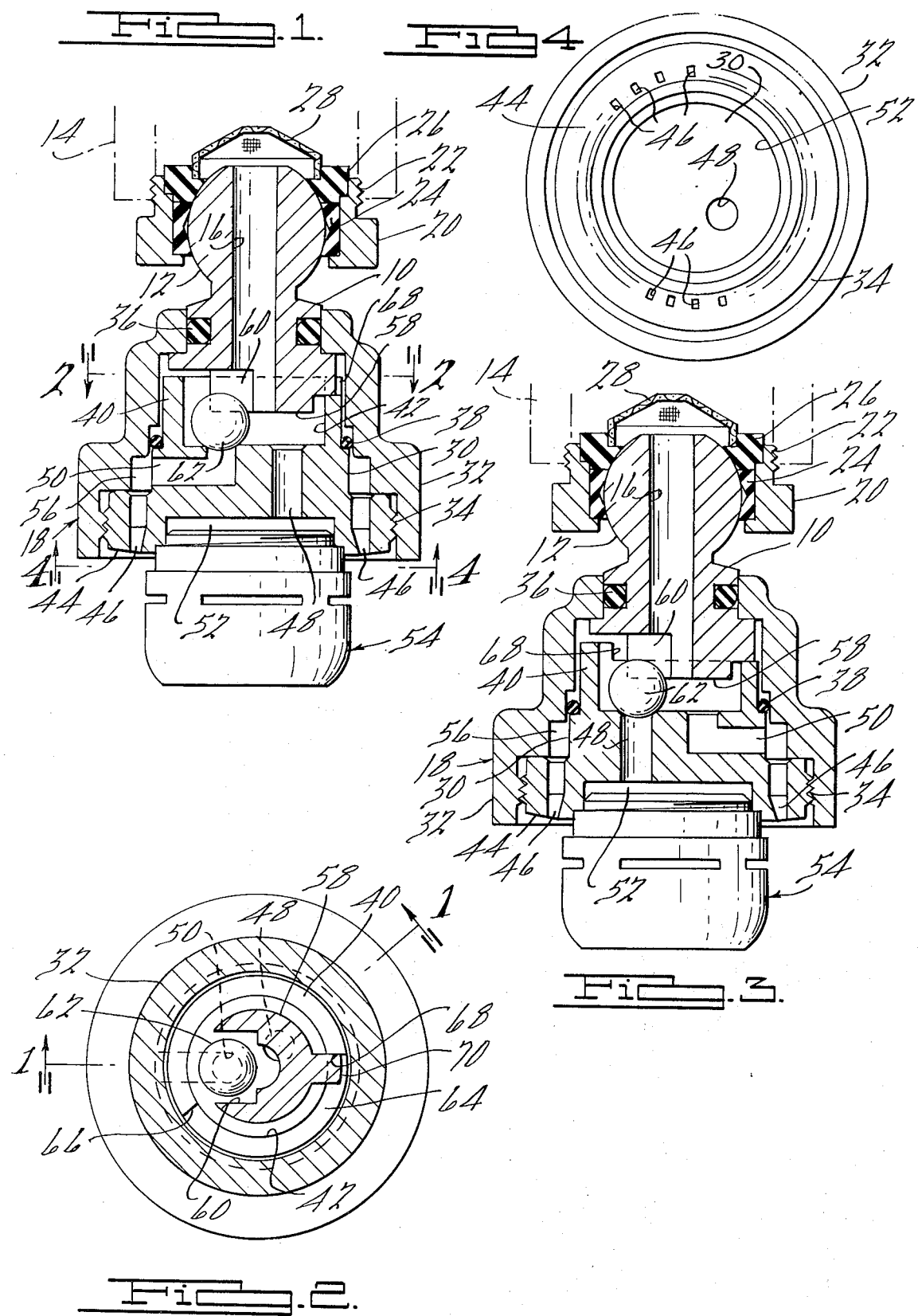

AERATOR SPRAY ATTACHMENT FOR FAUCETS

Combination spray and aerating devices for use with water faucets generally require a specially designed aerator as an integral part of such device. The present invention provides a device of the type described which is adapted to use a conventional aerator of the type which normally is threaded onto the faucet to provide an aerated stream of water. The spray-aerator device of the present invention includes a housing unit adapted to be swivelly attached to a faucet and having two outlet ports, one of which discharges through an annular series of spary-forming passages in the housing member. An aerator is threadedly secured to the housing and communicates with the other outlet port. Rotation of the housing opens a selected one of the output ports, thereby closing the other to provide the desired type of discharge.

IN THE DRAWINGS

FIG. 1 is a vertical sectional view on line 1—1 of FIG. 2 of a spray-aerating device showing the same positioned for producing an aerated stream of water;

FIG. 2 is a sectional view taken on line 2—2 of FIG. 1;

FIG. 3 is a fragmentary sectional view similar to FIG. 1 but showing the housing rotated to a position which provides a concical spray; and FIG. 4 is an end view of the housing unit taken on line 4—4 of FIG. 1.

The spary-aerator device of the present invention includes a swivel member 10 including a ball 12 at its upper end adapted to be connected to a faucet indicated at 14 and having a water passage 16 therein through which water from the faucet is discharged into a housing unit indicated generally at 18. The swivel member 10 is connected to the faucet by a nut 20 having threads 22 adapted to engage corresponding threads on the faucet 14. An annular retaining member 24 engages the ball 12 and a seal 26 at the upper end of the nut 20 provides a seal between the faucet 14 and the ball 12. If desired, a screen 28 may be mounted within the seal 26.

The housing 18 includes an inner member 30 and an outer member 32 threadedly secured together by threads 34. An O-ring 36 provides a seal between the swivel member 10 and the housing member 32, and an O-ring 38 provides a seal between the inner housing member 30 and the outer housing member 32.

The housing member 30 has a cylindrical wall 40 at its upper end defining an upwardly opening chamber 42 communicating with the passage 16 in the swivel member 10. The housing member 30 includes a larger diameter cylindrical portion 44 having an annular series of spray-forming openings 46 therein. The bottom wall of the chamber 42 is provided with outlet ports 48 and 50 which are offset from the axis of the housing member 30 and have an angular spacing of about 135° as shown in FIG. 2. The outlet port 48 extends through the housing member 30 and opens into a recess 52 which is internally threaded to receive an aerating device 54 which may be of any conventional design and which is adapted to aerate the water discharged through the outlet port 48. The outlet port 50 extends radially through the housing member 30 and discharges into an annular space 56 formed between the housing members 30 and 32 and which space communicates with the spray-forming passages 46.

The lower end of the swivel member 10 has a portion 58 which extends into the chamber 42 and defines a laterally open slot 60. A ball valve member 62 is seated on the bottom wall of the chamber 42 and is confined within the slot 60. The ball 62 is adapted to close either of the outlet ports 48 and 50, and in the position shown in FIG. 1 the ball closes the outlet port 50 so that water is discharged from the chamber 42 through the outlet port 48 into the aerator 54 to provide an aerated stream of water.

The nut 20 and the retaining member 24 secure the swivel member 10 to the faucet so that the swivel member is not rotatable relative to the faucet although the ball portion 12 allows the device to be freely swiveled relative to the faucet. The housing unit 18 is rotatable on the swivel member 10. Since the ball 62 is confined within the slot 60 in the swivel member 10, rotation of the housing on swivel member 10 will rotate the outlet ports 48 and 50 relative to the ball 62 and bring a selected one of the outlet ports beneath the ball 62 so as to be closed thereby. When the housing is rotated to change the type of discharge produced, the flow of water through the chamber 42 will tend to force the ball 62 toward the port that is approaching the ball 62 to sealingly engage such outlet port. The outlet ports 48 and 50 are somewhat smaller in diameter than the passage 16 in the swivel member 10 so that a slight back pressure will be created within the chamber 42 which holds the ball 62 firmly against the outlet port which it engages.

The upper end of the cylindrical wall 40 of the housing member 30 is recessed as at 64 to define spaced shoulders 66 and 68. The lower end of the swivel member is provided with a radial projection 70 adapted to engage the shoulders 66 and 68 to limit rotation of the housing 18 relative to the swivel member 10. As shown in FIG. 2, the projection 70 engages the shoulder 68 on the housing member 30 to define a position which produces an aerated flow of water. When the housing is rotated in a counterclockwise direction as shown in FIG. 2, the shoulder 66 will engage the projection 70 to bring the outlet port 48 beneath the ball 62 and open outlet port 50 to discharge water through the spray passages 46.

It will be apparent that any conventional type of aerator device 54 may be employed since the valving action to produce the desired form of discharge is independent of the design or construction of the aerating device. One example of the type of aerating device that may be employed with the present invention is shown in U. S. Pat. No. 2,761,662, although others may be employed as desired.

What we claim as our invention is:

1. In a spray aerator for attachment to a faucet for selectively discharging water in the form of a spray or an aerated stream, a swivel member having a water passage therein, means for attaching said swivel member to a faucet, housing having a chamber therein into which water is discharged from said swivel member and a pair of outlet ports opening from said chamber, said housing including a spray-forming passage means communicating with one of said outlet ports for discharging water from said one outlet port in the form of a spray, said housing being rotatable on said swivel member, said outlet ports being offset from the axis of rotation of said housing, a valve member in said chamber and means confining said valve member to a predetermined angular position offset from the axis of rotation of said housing whereby rotation of said housing brings a selected one of said outlet ports into engagement with said valve member so as to close said selected outlet port while opening the other, said housing having provisions for securing an aerator thereto in communication with the other of said outlet ports for discharging water from said other outlet port through said aerator.

2. A device according to claim 1 wherein said chamber has a bottom wall and said outlet ports are in said bottom wall.

3. A device according to claim 2 wherein said valve member rests on said bottom wall of said chamber.

4. A device according to claim 2 wherein each of said outlet ports is smaller than said passage in said swivel member.

5. A device according to claim 3 including means on said swivel member engageable with said valve member to confine said valve member to said predetermined angular position.

6. A device according to claim 5 wherein said valve member comprises a ball.

7. A spray aerator for attachment to a faucet for selectively providing a spray or an aerated stream of water, comprising a swivel member having a water passage therein, means for attaching said swivel member to a faucet, a housing mounted on said swivel member and having a chamber therein into which water is discharged from said passage in said swivel member and a pair of outlet ports opening from said chamber, an aerating device secured to said housing and communicating with one of said outlet ports for discharging water therefrom in the form of an aerated stream, said housing including spray-forming passage means communicating with the other of said outlet ports for discharging water therefrom in the form of a spray, said housing being rotatable on said swivel member, said outlet ports being offset from the axis of rotation of said housing, a valve member in said chamber and means confining said valve member to a predetermined angular position offset from the axis of rotation of said housing whereby rotation of said housing brings a selected one of said outlet ports into engagement with said valve member to close said selected port while opening the other.

8. A device according to claim 7 wherein said chamber has a bottom wall and said outlet ports are in said bottom wall.

9. A device according to claim 8 wherein said valve member rests on said bottom wall of said chamber.

10. A device according to claim 8 wherein each of said outlet ports is smaller than said passage in said swivel member.

11. A device according to claim 9 including means on said swivel member engageable with said valve member to confine said valve member to said predetermined angular position.

12. A device according to claim 11 wherein said valve member comprises a ball.

13. A device according to claim 6 wherein said ball has a limited area of movement relative to said swivel member so that water pressure in said chamber tends to move said ball into engagement with said selected outlet port.

14. A device according to claim 12 wherein said ball has a limited area of movement relative to said swivel member so that water pressure in said chamber tends to move said ball into engagement with said selected outlet port.

* * * * *